Figure 1:
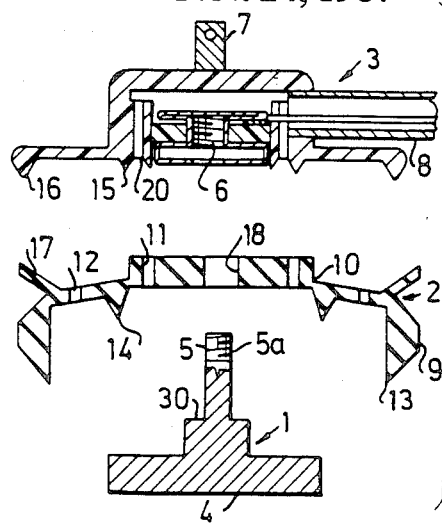

United States Patent [19]

Lundback

[11] Patent Number: 4,708,381
[45] Date of Patent: Nov. 24, 1987

[54] HOLDER FIXED BY VACUUM FOR INDUSTRIAL USE

[75] Inventor: Stig Lundback, Vaxholm, Sweden

[73] Assignee: Astra-Tech Aktiebolag, Sweden

[21] Appl. No.: 849,481

[22] Filed: Apr. 4, 1986

[30] Foreign Application Priority Data

Apr. 26, 1985 [SE] Sweden .............................. 85020493

[51] Int. Cl.$^4$ ........................ B25B 11/00; B25J 15/06
[52] U.S. Cl. ................................... 294/64.1; 248/362; 269/21
[58] Field of Search ................. 294/64.1, 65; 248/362, 248/363; 269/21; 271/90, 94, 103, 107; 279/3; 901/40

[56]             References Cited
          U.S. PATENT DOCUMENTS

| | | | |
|---|---|---|---|
| 2,680,994 | 6/1954 | Wood | 269/21 |
| 3,602,543 | 8/1971 | Sjodin | 294/64.1 |
| 4,221,356 | 9/1980 | Fortune | 248/363 |
| 4,561,687 | 12/1985 | Bostrom | 294/64.1 |
| 4,646,747 | 3/1987 | Lundback | 128/643 |

FOREIGN PATENT DOCUMENTS 307036  6/1971  U.S.S.R. .............................. 294/64.1
1016157 5/1983  U.S.S.R. .............................. 294/64.1

Primary Examiner—Johnny D. Cherry
Attorney, Agent, or Firm—Brumbaugh, Graves, Donohue & Raymond

[57]            ABSTRACT

A holder for industrial use attachable by vacuum comprises a rigid backpiece (3), a flexible intermediate element (2), and a central distance-maintaining element (1). The intermediate element (2) comprises a comparatively rigid sealing ring (9) with a sealing lip (13), which in use abuts against the element held fixed and with its opposite side against the backpiece (3). The central distance-maintaining element (1) is rigidly connected to the backpiece (3). The sealing ring (9) of the intermediate element (2) is movably and outwardly resiliently biassed in a direction away from the back piece. When the side of the sealing ring with the lip is unloaded and the ring is pressed outwardly, a vacuum valve (14) is automatically closed by the intermediate element, which valve opens when the holder is pressed against the object held fixed whereby the holder becomes attached by the sucking action.

4 Claims, 3 Drawing Figures

HOLDER FIXED BY VACUUM FOR INDUSTRIAL USE

The invention relates to a holder fixed by vacuum for industrial use, such as to lift objects, to transport objects, or merely to hold objects stationary.

When automatically handling materials in the manufacturing industry, transport of materials, of parts under manufacture, and of finished products is very common. In most cases, this concerns displacement of parts under manufacture, which are lacking specific arrangements for the lifting means to be attached. At present, a commonly used way of lifting, holding attached, and displacing laterally such workpieces is by attachment of suction cups which are rigidly connected to the set-up for carrying out the respective function. The suction cups are attached by suction to suitable, preferentially flat or slightly bent, surfaces of the workpiece to be held attached, displaced laterally, or lifted, by means of the negative pressure in the suction cups and in the evacuation system connected to them, and they are effected to loose their hold in that the negative pressure is removed by valve-controlled pressurizing.

The suction cups presently used for this purpose are of a very simple design. If, during a displacement or attachment step, a suction cup does not become attached or is falling off, air is sucked into the system being under vacuum resulting in loss of pressure and increased risk for other suction cups to fall off, in case of a system with several suction cups. It is obvious that this is connected with a substantial risk for the attachment and displacement steps to not succeed. At present, this risk is reduced by use of at least two negative pressure systems, which are independent of each other and, eventually, by use of actively controlled valve means for each separate suction cup or each negative pressure system. This risk of becoming disengaged is also reduced by use of pumps with a capacity considerably higher than needed for suffiently rapid evacuation of non-leaking systems. This over-dimensioning carries with it increased costs. Leaking systems moreover constitute an ocupational health load in terms of sound level.

I have now surprisingly found that the above-mentioned lifting and fixation operations may be carried out by a new type of suction cup, without advanced controlling and regulating technology, and without the over-dimensioning of suction pumps. This suction cup has the property of being self-sealing in an idle state.

The object of the invention is a suction cup, below also called holder fixed by vacuum, exhibiting these advantageous properties, connected to a vacuum pump or to a vacuum reservoir and permanently or temporarily attached to a lifting arrangement or to an arrangement for lateral displacement or just for keeping fixed, and abutting with its front side against the object to be displaced, lifted, or kept fixed, in the following called workpiece, and which comprises a rigid back-piece and at least partially flexible sealing means, and an essentially rigid central distance-maintaining element, which sealing means comprise a sealing ring ending in a sealing lip, which when fixed at the workpiece abuts against a preferentially flat or moderately curved surface workpiece, so that a volume in communication with the vacuum source and defined by said surface and sealing means is delimited, whereby said distance-maintaining element and said sealing lip are movably arranged relatively to each other under the influence of a resilient force operating through spring means, which strives to separate the distance-maintaining element from a plane defined by the sealing lip, from a working position to an idle position, which movement is arranged for activation of valve means for closing the vacuum connection to said volume, in such a way that the distance-maintaining element adopts the same position in relation to the back-piece both in the working position and in the idle position, and that said sealing lip is seated on a movable ring, which is supported against the back-piece in the working position.

In a system for lifting, displacement or fixation of larger workpieces where a number of suction cups are routinely used, the use of self-sealing suction cups according to the invention dispenses with the need to use multiple separate systems or over-dimensioned vacuum pumps in order to attain acceptable safety. Systems with suction cups according to the invention will also operate considerably more silently than systems provided with suction cups according to known technology.

When attaching to the workpiece, a minor force is needed for activation of the suction cup. This force is produced by moving the holder with part of the lifting arrangement towards the surface of the workpiece or by adapting the weight of the suction cup or the suction cup in combination with the part of the lifting arrangement rigidly connected to it, so that activation is achieved by its own weight when the suction cup rests against the surface of the workpiece.

The suction cup is preferentially attached to flat or moderately curved surfaces. By variation of the position of the sealing ring which ends in a sealing lip in relation to the distance-maintaining element, as well as by curved design of the surface of the distance-maintaining element facing at surface of the object, even objects lacking suitable flat or moderately curved surfaces can be held attached. In this and other instances, e.g., when fixing the holder at objects with surfaces not to be scratched or hurt in other ways, the surface or the distance-maintaining element can be made of or be coated with an elastic resilient material.

Conduction of vacuum to the suction cup according to the invention is achieved by means of a flexible vacuum hose, but may of course be done in metal tubes or in channels in the part of the arrangement for lifting or keeping attached which is rigidly connected to the suction cup.

The suction cup may be rigidly or removably connected to an arrangement for lifting, for lateral displacement, for keeping attached only, or to an arrangement combining two or all of these functions.

In case the suction cup is to be used for lifting or fixation purposes that necessitate rapid attachment and disengagement, the attachment is advantageously carried out in an active way by externally controlled force impact, while disengagement is obtained by putting the suction cup under pressure by a pressurized air pulse generated in an arrangement of known type, which is arranged between the suction cup and the vacuum source, and which simultaneously with the pressure pulse temporarily closes the part of the vacuum system facing the vacuum source. If the frequency of repeated working steps does not necessitate such a disengagement effected by a pressure pulse, the arrangement of a simple aeration valve between the suction cup and the vacuum system suffices, preferentially in combination with an arrangement for temporary closing the part of the conduction system facing the vacuum source.

Figure 2:
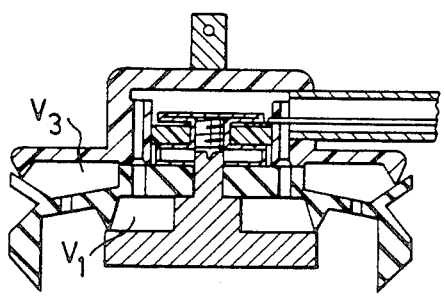
Figure 3:
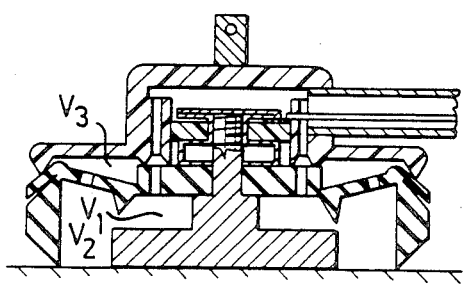

The invention will now be described with reference to a preferred but not limiting embodiment. FIG. 1 shows an exploded view of a holder fixed by vacuum consisting of three components. FIG. 2 shows a cross-sectional view of a holder in an idle position, and FIG. 3 shows a cross-sectional view of a holder in an active position i.e., with the holder attached to the object, which is to be lifted, displaced laterally, or only is to be kept fixed.

The various components of the embodiment are best seen from FIG. 1. Distance-maintaining element 1 has a surface 4 adapted to the workpiece, in the present case a flat surface. Surface 4 is covered by a thin layer of rubber, not shown in the figures. The outer form of the distance-maintaining element 1 in addition to that is determined by the described cooperation with the other components of the holder, especially with lip 14. The distance-maintaining element 1 has in its part facing backpiece 3 a stem-like part 5, at the end of which an external thread 5a is arranged fitting into an internal thread 6 located in backpiece 3, whereby element 1 can be secured at the backpiece by screwing on. The depth of screw both in backpiece 3 and on stem 5 is adapted to give the correct distance between surface 4 and other parts of the holder, especially sealing lip 13 on ring 9. The stem part 5 penetrates a hole 18 in an intermediate element 2, which incorporates, i.a., sealing ring 9. Backpiece 3 is provided with attachment means 7 in order to be attached to the lifting, transport or attachment arrangement. To backpiece 3, there is also attached a vacuum hose 8 connected to a vacuum pump or vacuum reservoir (not shown). The attachment of hose 8 to backpiece 3 leads to a volume in the upper part of the backpiece, from where there are arranged a number of holes 20 around the part of attachment of the central distance-maintaining element, which holes provide communication of said volume to the surface of backpiece 3 facing intermediate element 2.

When the three parts shown in FIG. 1 are mounted, the configuration shown in FIG. 2 is obtained. Thereby, the central portion of the intermediate element 2, which surrounds the stem portion of the central distance-maintaining element 1, is fixed in direction of that stem portion, in part by the abuttng surface 30 on the portion of the central distance-maintaining element 1 situated in direction of its frontal part, and in part by the corresponding portion of backpiece 3 facing intermediate element 2. For sake of clarity, only FIG. 1 has been provided with reference numbers, but a comparison is anyway easy to make.

In the example shown, parts 1 and 2 are rotationally symmetric. This simplifies manufacture but is not absolutely necessary.

Part 2, which is made of rubber or some similar elastic material, has a relatively rigid outer circular portion 9 with a circumferentially arranged sealing lip 13 which, in an active position, is sealed against the workpiece. To start with, the function in an idle position will be described according to FIG. 2.

It is obvious that the comparatively rigid central portion of the intermediate element 2, which portion is provided with a hole 18, will abut at the sealing lip 15 in backpiece 3. The frontal part of the central portion is connected to the frontal part of the intermediate element by concentrically arranged holes 11, at which frontal part is arranged another sealing lip 14. This other sealing lip will abut at the back side of the distance-maintaining element 1, and both lip 14 and lip 15 will seal a first volume $V_1$ under vacuum around the central portion of the distance-maintaining element 1, in that a certain bending of the central portion of the intermediate element 2 is occurring, to which also contributes that flange 17 of the intermediate element 2 is abutting elastically against lip 16 at backpiece 3. With the configuration in FIG. 2, only said volume $V_1$ around the central portion of distance-maintaining element 1 will be under vacuum, notwithstanding the occurrence of insignificant leakage.

When the holder provided with vacuum, in a state according to FIG. 2, is brought into contact with the workpiece, the following occurs. When the circumferential lip is pressed against the workpiece, the force will affect flange 17 via the comparatively rigid ring 9, which flange is resiliently deformed, whereby the central portion of part 2 is more extensively deformed and lip 14 eases away from the rear side of distance-maintaining element 1.

A second volume $V_2$, defined by the peripheral portion of intermediate element 2, by the portion of the workpiece delimited by ring 9 with sealing lip 13, and by the peripheral part of central distance-maintaining element 1, communicates with the vacuum source via the first volume $V_1$ mentioned above. Because holes 12 are provided in the peripheral part of intermediate element 2, a third volume $V_3$ will become provided with vacuum, which volume is located between the peripheral portions of intermediate element 2 and backpiece 3, whereby sealing lips 13 and 16 are sealing between backpiece 3 and the surface of the workpiece. Thereby, the configuration shown in FIG. 3 is obtained. From FIG. 3 it is to be seen that backpiece 3 and ring 9 are functioning as a coherent entity, although an elastic deformational force affects ring 9 in radial direction from backpiece 3 through flange 17, which deformational force however is neglible in comparison with the pneumatic forces. A break force affecting the attachment between the suction cup and the surface of the object held attached will result in a deformation of intermediate element 2, until the abutment of lip 13 ceases and air enters. Thereby the holder falls off and flange 14 resiliently moves back, and the position shown in FIG. 2 with the valve seal once again in effect is obtained.

Thus, in order to obtain good functioning, the surface 4 of the distance-maintaining element 1 in the position shown in FIG. 2 must be inwardly drawn in relation to lip 13 on the ring 9.

The described embodiment has been found to function well. For example, at a negative pressure of 0.1 kp/cm$^2$, a prototype with a diameter of 30 mm for ring 9 has been shown to be able to lift a workpiece with flat surfaces weighing 300 g. When the holder is made with larger dimensions and, eventually, for a higher negative pressure, the portions of the intermediate element 2 that must be relatively rigid have to be strengthened e.g., by reinforcements. When the holder is manufactured in large dimensions, it might be advantageous not to make the intermediate element 2 in one single piece, but rather by assembling several parts which are adapted to each other dimension-wise and with respect to material properties.

The connection between distance-maintaining element 1 and backpiece 3 may also be arranged in the form of a press-stud connection or in a similar way, provided that the load affecting the holder is small, and when it is desirable to make the distance-maintaining element 1 and the intermediate element 2 easily exchangeable e.g., in order to facilitate cleaning.

I claim:

1. A holder for attachment to an object by means of a vaccum from a vacuum source to enable the object to be lifted, transported or held stationary comprising a rigid backpiece, a seal element having a peripheral sealing ring portion terminating in a sealing lip, which lip defines a plane and is adapted to engage a substantially planar surface portion of the object, and having a deformable flange portion joined to the sealing ring portion adjacent its perimeter and to the backpiece at a first sealed juncture therewith inwardly of its perimeter, the flange portion being deformable to enable movement of the sealing ring portion between active and idle positions relative to the backpiece, and a substantially rigid distance-maintaining element affixed to the backpiece within the sealing lip and having a frontal surface spaced-apart toward the backpiece from the plane of the sealing lip when the sealing ring portion is in its idle position and located to engage the object when the sealing ring portion in its active position, valve means coacting between the flange portion of the seal element and the distance-maintaining element, the valve means being closed when the sealing ring portion is in its idle position and open when the sealing ring is in its active position, means associated with the backpiece for communicating a volume $V_1$ within the seal element and upstream of the valve means with the vacuum source, and resilient means acting between the backpiece and seal element for urging the sealing ring portion toward its idle position to keep the valve means closed when the object is not engaged and for yielding upon movement of the sealing ring portion toward its active position by engagement with the object surface to enable the valve means to open and communicate the vacuum from the vacuum source to a second volume $V_2$ defined by the seal element and the object.

2. A holder according to claim 1 wherein the valve means comprises annular surfaces on the flange portion of the seal element and on the distance-maintaining element that engage when the sealing ring portion is in its idle position and that disengage when the flange portion is deformed upon movement of the sealing ring portion toward its active position.

3. A holder according to claim 1 wherein the resilient means is a resiliently deformable rib portion on the seal element located adjacent to the perimeter of the flange portion and engageable with a flange portion of the backpiece.

4. A holder according claim 3 wherein the rib portion of the seal element engages the flange portion of the back piece at a second sealed juncture, wherein a portion of the flange portion of the seal element and a portion of the back piece between the first and second sealed junctures define a volume $V_3$, and wherein at least one hole in the flange portion of the seal element communicates the volume $V_2$ with the volume $V_3$.

* * * * *